US007117715B2

(12) United States Patent
Soley

(10) Patent No.: US 7,117,715 B2
(45) Date of Patent: Oct. 10, 2006

(54) SERVO MECHANISM TEST STAND

(75) Inventor: David D. Soley, Toledo, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 14 days.

(21) Appl. No.: 10/889,543

(22) Filed: Jul. 9, 2004

(65) Prior Publication Data

US 2006/0005604 A1 Jan. 12, 2006

(51) Int. Cl.
*G01L 27/00* (2006.01)
*G01M 19/00* (2006.01)

(52) U.S. Cl. ...................................... 73/1.71; 73/865.9

(58) Field of Classification Search ................. 73/1.71, 73/865.9
See application file for complete search history.

(56) References Cited

U.S. PATENT DOCUMENTS

| | | | | |
|---|---|---|---|---|
| 4,427,431 | A | 1/1984 | Mumford et al. | |
| 4,587,836 | A * | 5/1986 | Hewlett | 73/49.8 |
| 4,615,722 | A | 10/1986 | Steffan et al. | |
| 4,685,947 | A | 8/1987 | Liska et al. | |
| 4,705,552 | A | 11/1987 | Liska et al. | |
| 4,723,977 | A | 2/1988 | Grant et al. | |
| 4,980,825 | A | 12/1990 | Tootell et al. | |
| 5,048,329 | A | 9/1991 | Marchini et al. | |
| 5,235,525 | A | 8/1993 | Bybee | |
| 5,301,128 | A | 4/1994 | Bybee | |
| 5,337,262 | A | 8/1994 | Luthi et al. | |
| 5,445,662 | A | 8/1995 | Peterson et al. | |
| 5,580,366 | A | 12/1996 | Farkas et al. | |
| 5,624,473 | A | 4/1997 | Farkas et al. | |
| 5,904,745 | A | 5/1999 | Nafziger et al. | |
| 5,936,153 | A * | 8/1999 | Steckler et al. | 73/121 |
| 6,021,667 | A | 2/2000 | Gellerson et al. | |
| 6,212,909 | B1 | 4/2001 | Leidy et al. | |
| 2003/0113400 | A1 | 6/2003 | Lai et al. | |

* cited by examiner

*Primary Examiner*—Daniel S. Larkin

(57) ABSTRACT

An apparatus to test a servo mechanism that has an electric, servo controlled motor includes a portable frame, a fluid source carried by the frame, a mounting station carried by the frame and adapted to receive a servo mechanism. The mounting station has a power connector through which electric power is suppled to a servo mechanism, a resolver connector for connection to the servo mechanism, a fluid inlet connector through which fluid from the fluid source is provided to the servo mechanism and a fluid outlet connector through which fluid can be discharged from the servo mechanism. Each of the power, resolver, fluid inlet and fluid outlet connectors are preferably blind mate quick connectors adapted to be interconnected with corresponding connectors on the servo mechanism upon installation of the servo mechanism in the mounting station.

18 Claims, 6 Drawing Sheets

SERVO MECHANISM TEST STAND

FIELD OF THE INVENTION

The present invention relates generally to servo mechanisms and more particularly, to a test stand for testing and programing servo mechanisms.

BACKGROUND OF THE INVENTION

Many glass containers are formed by so-called individual section glassware forming machines. Many of the mechanisms in an individual section glassware forming machine are controlled by servo mechanisms. For instance, some glassware forming machines may include takeout, invert and electronic sweepout servo mechanisms.

The invert servo mechanisms transfer glass blanks from a blank mold to a final blow mold. Typically, the glass blanks are moved about an arc of 180° and are inverted when moved along this arc by the invert servo mechanism. After being blow molded in the final blow mold, the formed glass articles are removed from the blow mold by takeout servo mechanisms and may be moved to a dead plate to permit the blown glass articles to partly cool before they are transferred to a conveyor for further processing. From the dead plate, the formed glass articles may be moved to a conveyor or other location by an electronic, servo controlled sweepout mechanism.

In some systems, the takeout, invert and/or sweepout servo mechanisms are installed at a glassware forming machine and thereafter initialized, programed and put through various test procedures or cycles to ensure that they are operating correctly. Similar testing or validation procedures are done when repaired or serviced servo mechanisms are installed in a glassware forming machine, and when troubleshooting the machine itself or one or more of the mechanisms to locate a fault source, for example. During these times, the glassware forming machine is not producing commercial product, reducing the production and efficiency of the glassware forming machine.

SUMMARY OF THE INVENTION

An apparatus to test a servo mechanism that has an electric, servo controlled motor includes a portable frame, a fluid source carried by the frame, a mounting station carried by the frame and adapted to receive a servo mechanism. The mounting station has a power connector through which electric power is suppled to a servo mechanism, a resolver connector for connection to the servo mechanism, a fluid inlet connector through which fluid from the fluid source is provided to the servo mechanism and a fluid outlet connector through which fluid can be discharged from the servo mechanism. Each of the power, resolver, fluid inlet and fluid outlet connectors are preferably blind mate quick connectors adapted to be interconnected with corresponding connectors on the servo mechanism upon installation of the servo mechanism in the mounting station.

According to another presently preferred embodiment of the invention, an apparatus is provided to test at least two servo mechanisms and includes a portable frame, a fluid source carried by the frame, and at least two mounting stations carried by the frame with each mounting station adapted to receive a separate servo mechanism. The apparatus further includes at least two power outputs with each of the power outputs communicating with a separate one of the mounting stations, and at least two fluid connectors with each of the fluid connectors communicating with the fluid source and with a separate one of the mounting stations to permit fluid communication between the fluid source and the mounting stations and adapted to communicate with each servo mechanism mounted in the mounting stations to provide fluid flow to the servo mechanisms. In one presently preferred implementation, the apparatus permits more than one servo mechanism to be simultaneously received on the frame, and further permits independent or simultaneous testing of each servo mechanism on the frame. One presently preferred aspect of the apparatus provides a control interface carried by the frame that facilitates communication of a controller with each servo mechanism for controlled operation of each servo mechanism as desired for testing or other monitored operation of the servo mechanisms.

BRIEF DESCRIPTION OF THE DRAWINGS

These and other objects, features, advantages and aspects of the present invention will be apparent from the following detailed description of the preferred embodiments and best mode, appended claims and accompanying drawings in which:

DETAILED DESCRIPTION OF THE PREFERRED EMBODIMENTS

Figure 1:
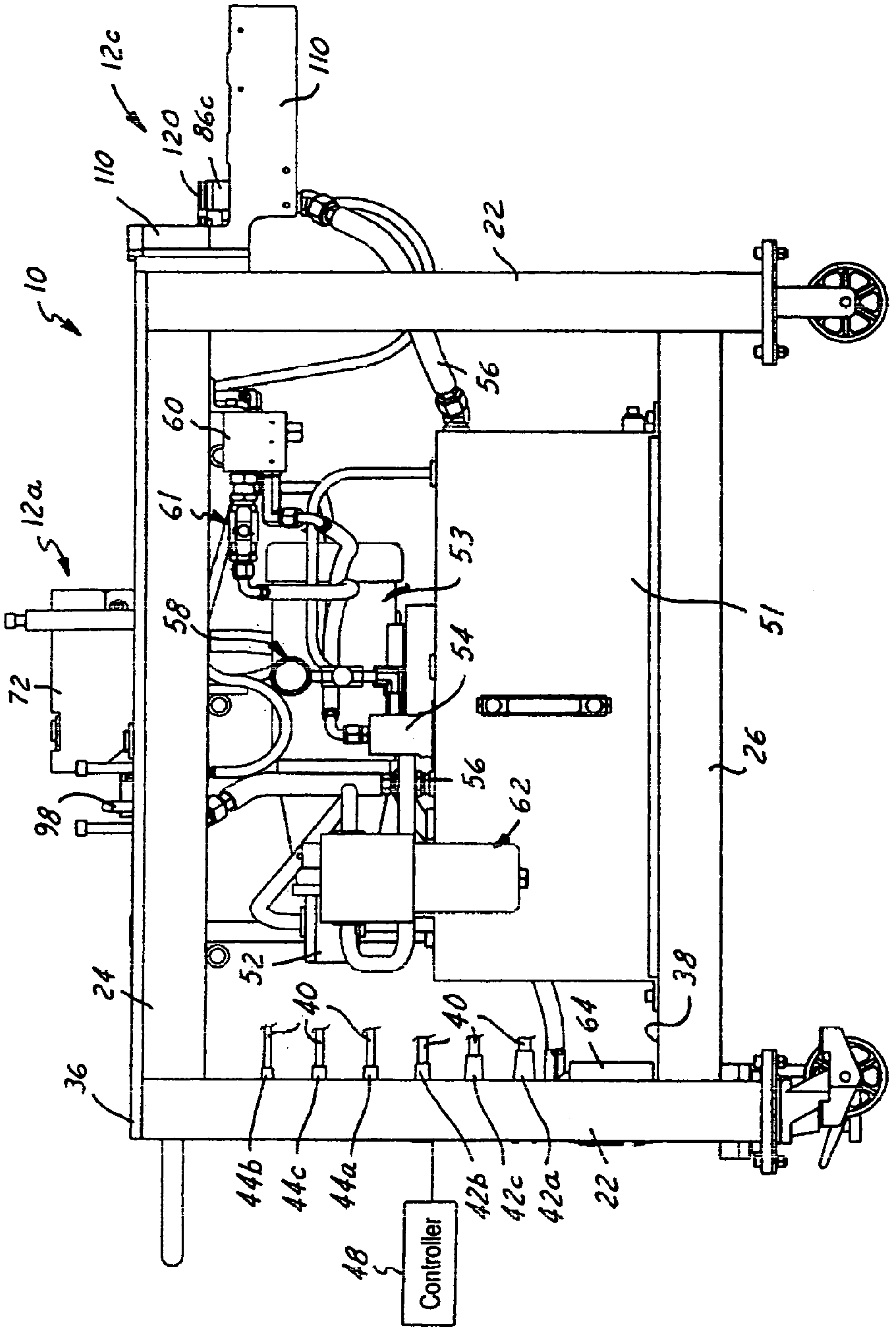
FIG. 1 is a side view of an apparatus for testing and controlling servo mechanisms according to one presently preferred embodiment of the invention.
Figure 2:
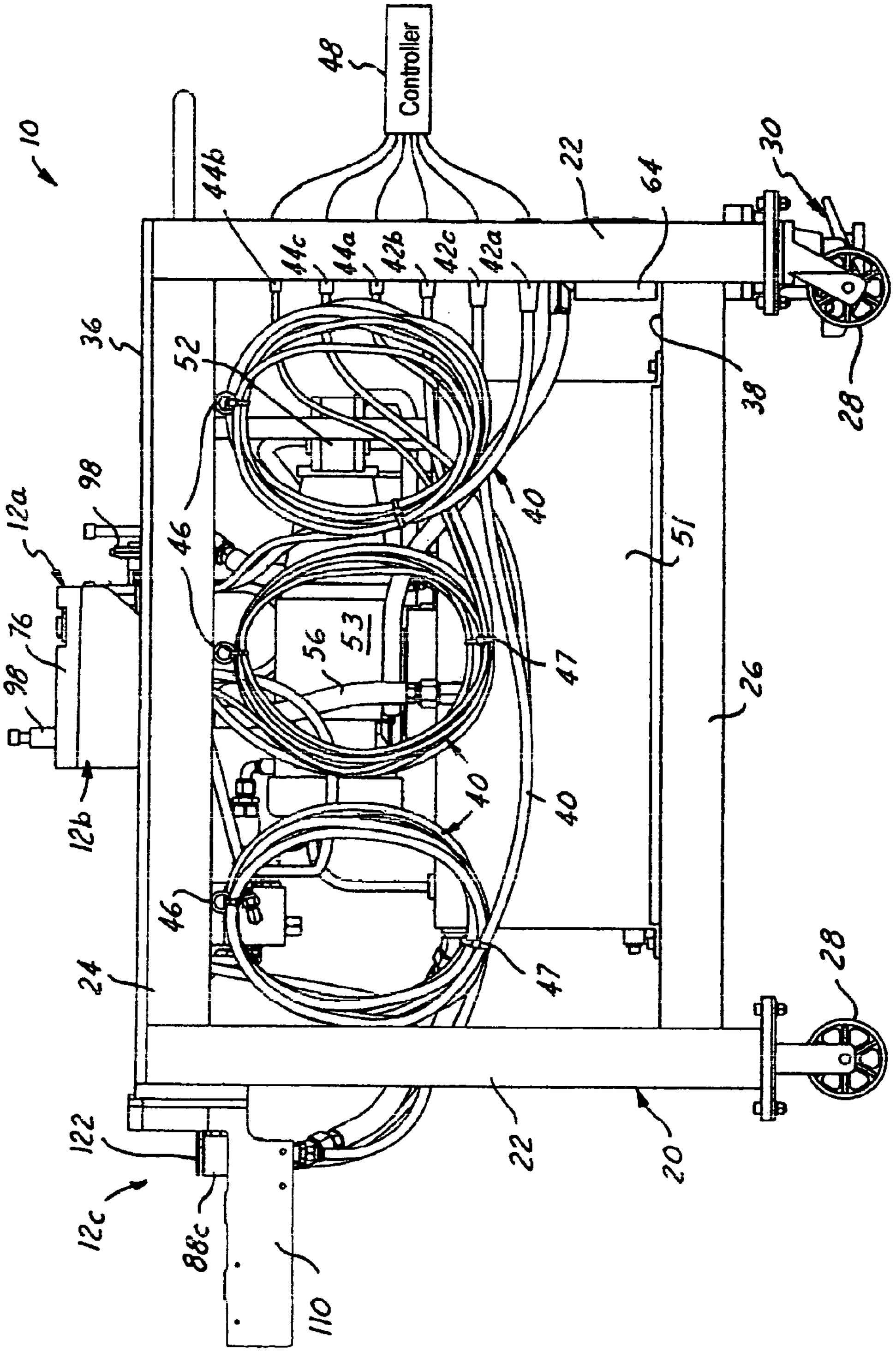
FIG. 2 is an opposite side view of the apparatus of FIG. 1.
Figure 3:
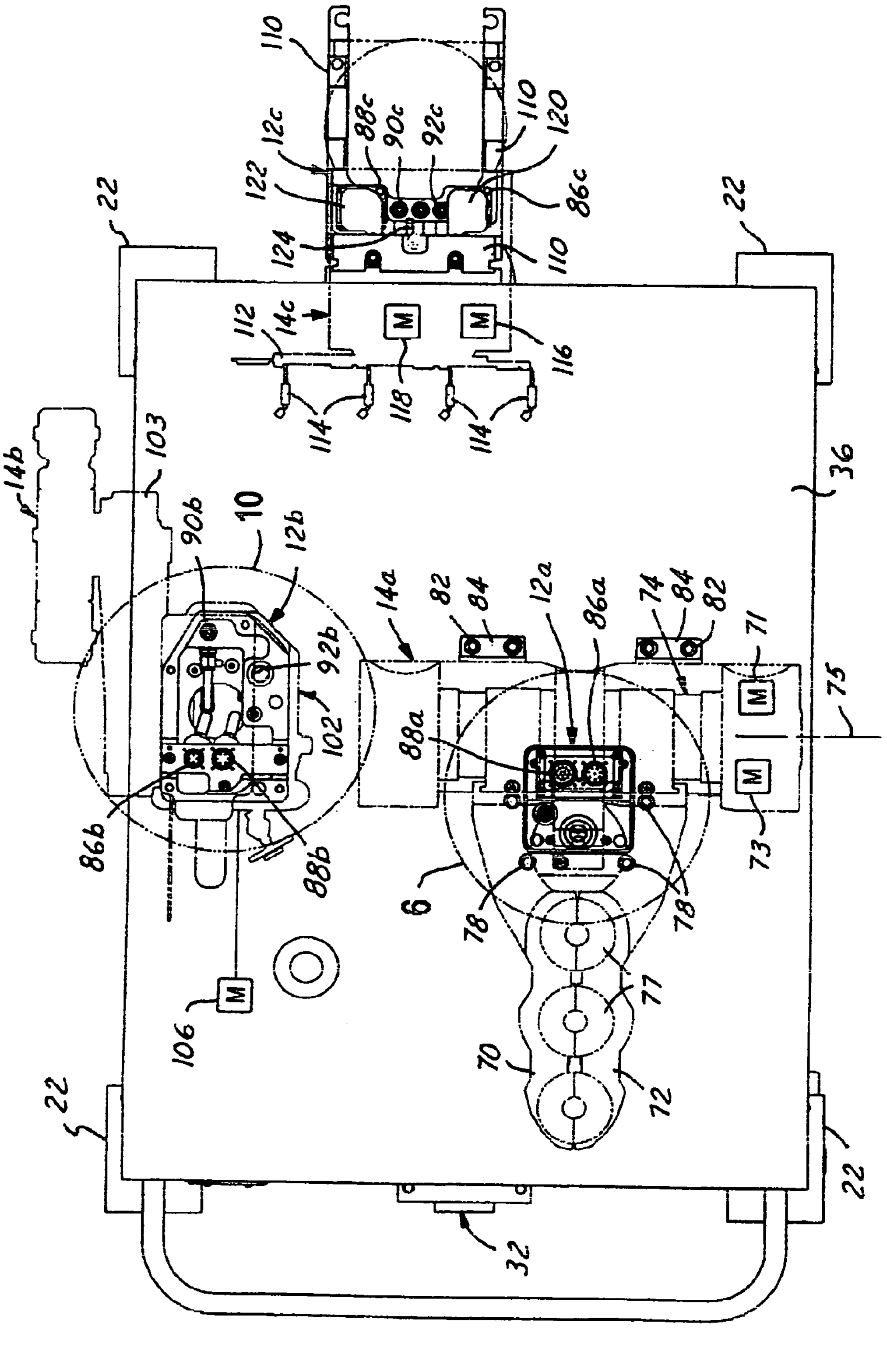
FIG. 3 is a plan view of the apparatus.
Figure 5:
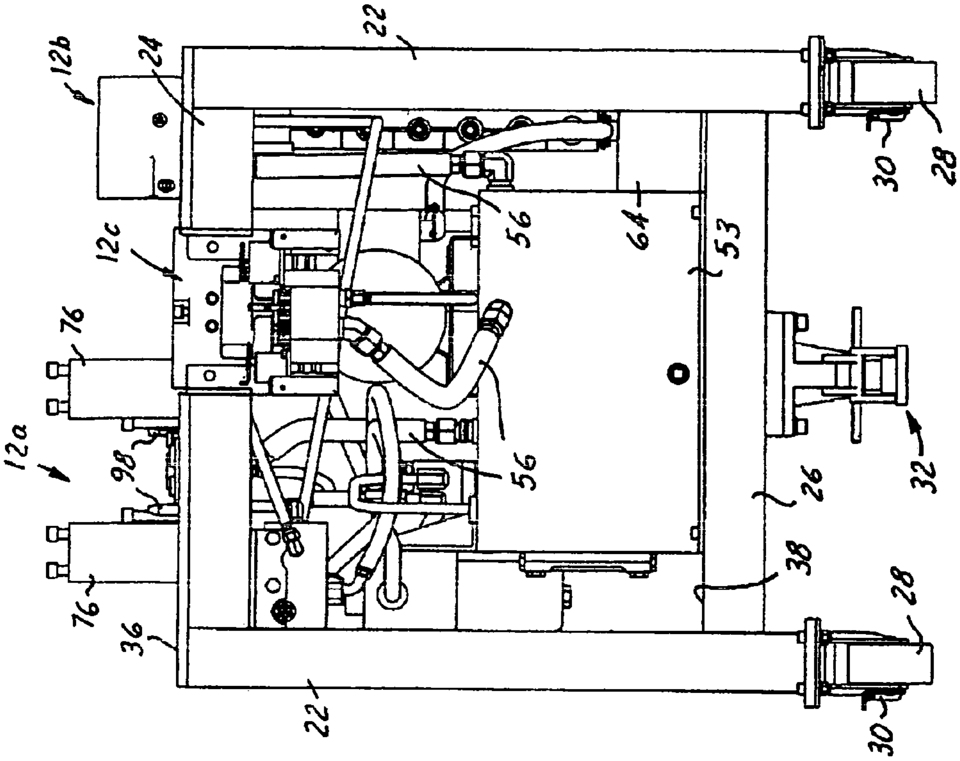
FIGS. 4 and 5 are views of opposite ends of the apparatus.
Figure 4:
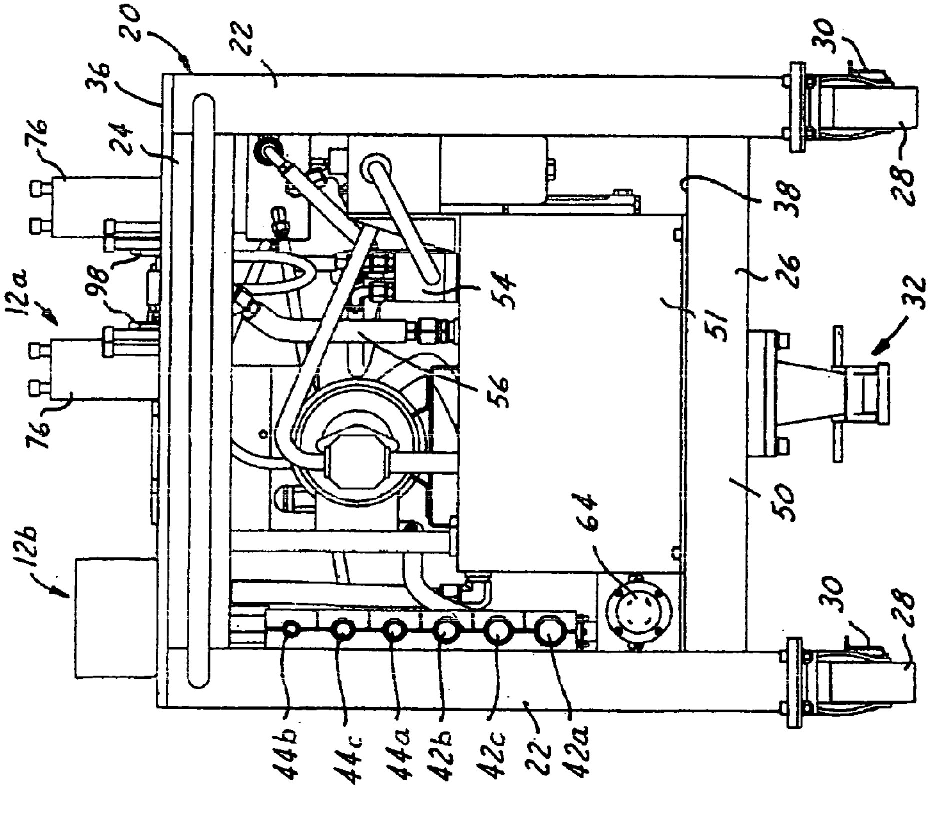

Referring in more detail to the drawings, FIGS. 1–5 illustrate a servo mechanism control apparatus 10 according to one presently preferred embodiment of the present invention. Preferably, the apparatus 10 is portable, and includes multiple mounting stations 12*a*, 12*b*, 12*c* each adapted to receive a different servo mechanism 14 (FIG. 3). According to one presently preferred aspect of the invention, the apparatus 10 is capable of receiving and operating at least two different servo mechanisms 14*a*, 14*b* either individually or simultaneously. In one form, the apparatus 10 may be used to test, cycle, break-in, troubleshoot, or otherwise operate three different servo mechanisms 14*a*, 14*b*, 14*c* used in individual section glassware forming machines. The servo mechanisms may include takeout, invert and sweep-out mechanisms 14*a*, 14*b*, 14*c*, respectively, as discussed in more detail hereinafter.

The apparatus 10 includes a main frame 20 including four upright posts 22 interconnected by spaced and generally parallel upper and lower beams 24, 26, respectively, providing a hexahedron structure. At the lower end of each post 22, a wheel or caster 28 is provided so that the apparatus 10 may be rolled along a floor for ease in moving the apparatus 10. A brake 30 is preferably provided on at least one, and more preferably, two or more of the casters 28 to prevent movement of the apparatus 10 when desired. A floor lock 32 may also be provided to facilitate positively locating the apparatus 10 and to further anchor the apparatus 10 against movement. An upper plate 36 is disposed on top of and spans the posts 22 and upper beams 24, and a lower plate 38 is provided between the posts 22 and on top of the lower beams 26 so that the upper and lower plates 36, 38 define two parallel support surfaces.

The apparatus 10 preferably also includes a plurality of electrical connectors leading to cables 40 to provide electrical power and resolver feeds to each of the plurality of servo mechanism mounting stations 12*a*, 12*b*, 12*c* on the apparatus 10. In the apparatus 10 as shown, three mounting stations 12*a–c* are provided (one for each of the takeout, invert and sweep-out mechanisms 14*a–c*), and twelve connectors are provided as will be described in more detail hereinafter. Power and resolver feeds are provided at each mounting station, and each of those feeds is connected, such as by a cable 40, to a main power and resolver connector on the frame 20. So, there are three main power connectors 42*a*, 42*b*, 42*c* and three main resolver connectors 44*a*, 44*b*, 44*c*. As shown in FIG. 2, extra cable 40 may be coiled and hung by hooks 46 carried by the frame 20, and bound with cable ties 47, for example. Each power and resolver connector 42*a–c*, 44*a–c* is adapted to communicate with a main controller 48. The main controller 48 may be portable with the apparatus 10, may be portable but carried separately from the apparatus 10, or may be fixed, or some combination of these, by way of examples without limitation. The main controller 48 is communicated with each power connector 42*a–c* and each resolver connector 44*a–c* and preferably capable of controlling the various servo mechanisms 14*a–c* in the same manner as in a full production run of the mechanisms. In this manner, each servo mechanism 14*a–c* can be controlled and cycled as if it were being used in a glassware forming machine to ensure satisfactory operation of the mechanisms.

To further enable cycling of the servo mechanisms 14*a–c*, as in production use, the apparatus 10 preferably includes a hydraulic source 50 that is communicated with each mounting station 12*a–c*, and hence, with servo mechanisms 14*a–c* mounted on the apparatus 10. The hydraulic source 50 preferably includes a fluid tank 51 and a fluid pump 52 (see FIG. 4) driven by a motor 53 to provide oil or other fluid from the tank to the servo mechanisms 14*a–c* at the same rate and pressure as in production use of the mechanisms. The pump 52 may be carried on the lower plate 38 and preferably has one or a plurality of outlets 54, to provide fluid to each mounting station 12*a–c*. Fluid return lines 56 are also provided between the servo mechanisms 14*a–c* and the fluid tank to permit recirculation of the oil or other fluid. Pressure gauges 58 may be provided to ensure desired operating pressure of the circulated fluid. A flow valve 60 may be provided to ensure desired fluid flow rates and a manual shut-off valve 61 may be provided upstream of the flow valve 60. And one or more filters 62 may be provided to remove contaminants from the fluid. An additional power inlet 64 may also be provided on the frame 20 for providing electrical power to the pump 52.

As best shown in FIG. 3, a first mounting station 12*a* of the apparatus 10 is preferably adapted to receive an invert mechanism 14*a* such as disclosed in U.S. patent application Ser. No. 10/609,444, the disclosure of which is incorporated herein by reference in its entirety. The invert mechanism 14*a* has a pair of arms 70, 72 carried on a shaft assembly 74 and driven by a servo motor 71 for lateral movement of the arms 70, 72 toward and away from each other to separate and close the arms together, and by another servo motor 73 for reciprocating pivoted movement about the axis 75 of the shaft 74 through inversion and reversion strokes. In production, the arms 70, 72 carry neck ring assemblies 77 that form and hold neck portions of glass containers that are moved from a blank mold to a final blow mold by the invert mechanism 14*a* during the inversion stroke of the invert mechanism 14*a*. The reversion stroke returns the arms 70, 72 to a start position adjacent to the blank mold for a subsequent cycle. The lateral or close and open strokes permit the arms 70, 72 to hold and release the blanks as desired.

Figure 6:
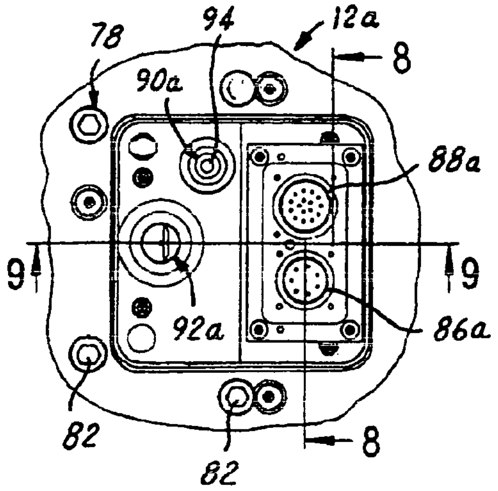
FIG. 6 is an enlarged fragmentary view of the encircled portion 6 in FIG. 3.
Figure 7:
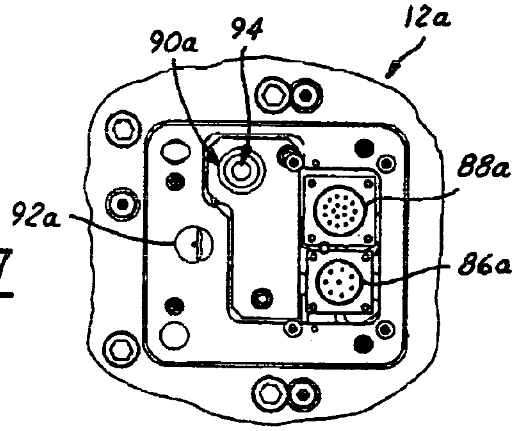
FIG. 7 is an enlarged fragmentary view similar to FIG. 6 with one or more cover plates removed.
Figure 8:
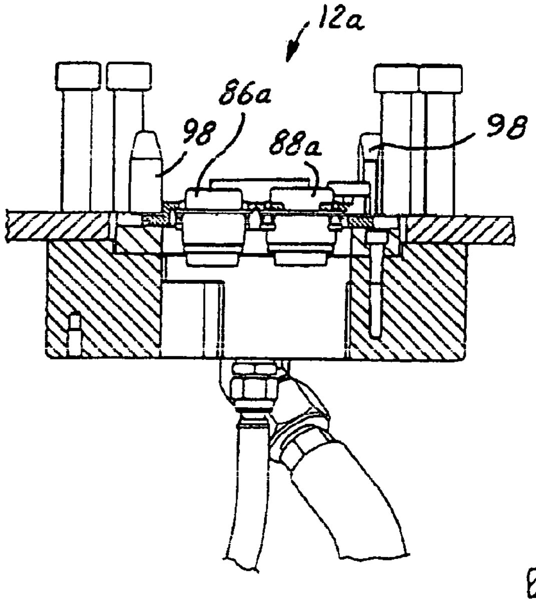
FIG. 8 is a fragmentary cross-sectional view taken generally along line 8—8 of FIG. 6.
Figure 9:
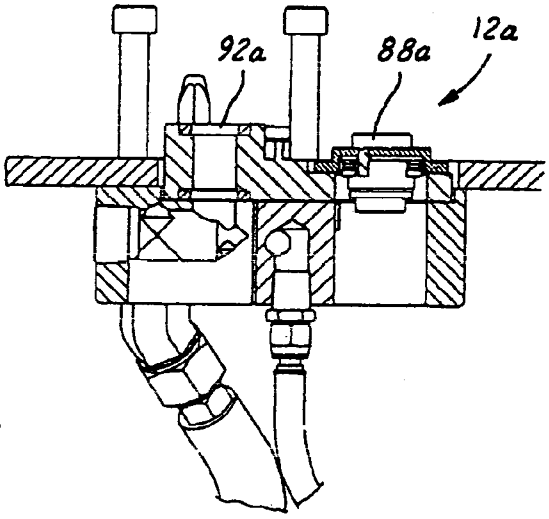
FIG. 9 is a fragmentary sectional view taken generally along line 9—9 in FIG.6.

As best shown in FIGS. 3–9, to receive the invert mechanism 14*a*, the first mounting station 12*a* preferably includes one or more spacers or mounting blocks 76 and a plurality of threaded openings 78 that receive threaded fasteners 82 disposed through mounting flanges 84 on the invert mechanism 14*a*. The first mounting station 12*a* preferably mimics the seat or mount for the invert mechanism 14*a* that is on the production glassware forming machine with which it is used. As best shown in FIG. 6, the first mounting station 12*a* also includes a power connector 86*a* and a resolver connector 88*a* for electrical power and resolver connections to the invert mechanism 14*a*, and fluid inlet and outlet connectors 90*a*, 92*a*, respectively, for enabling fluid flow (such as lubricant) to and from the invert mechanism 14*a*. Preferably, the fluid inlet connector 90*a* includes a normally closed valve 94 that prevents fluid flow to the fluid inlet connector 90*a* unless an invert mechanism 14*a* is fully secured in the first mounting station 12*a*. Likewise, the invert mechanism 14*a* may include drain valves (not shown) at its fluid inlet and outlet connectors (not shown) that are closed unless the invert mechanism 14*a* is mounted in the first mounting station 12*a*, or on a glassware forming machine, to prevent fluid from draining from the invert mechanism 14*a*.

Each of the power, resolver, fluid inlet and fluid outlet connectors 86*a*, 88*a*, 90*a*, 92*a* is preferably a quick-connect, blind-mating type connector that automatically mates with a corresponding connector on the invert mechanism 14*a* when the invert mechanism 14*a* is secured in place on the upper plate 36. Each of the connectors is preferably oriented on the upper plate 36 facing upward (in the orientation of the apparatus as shown in the drawings), and is adapted to be connected with a mating connector when the invert mechanism 14*a* is moved generally perpendicular toward and onto the upper plate 36. One or more locating pins 98 (FIGS. 1 and 2) may extend upwardly from the upper plate 36 to facilitate locating the invert mechanism 14*a* in the first mounting station 12*a*. So constructed and arranged, upon mounting the invert mechanism 14*a* in the first mounting station 12*a*, the invert mechanism 14*a* is simultaneously and substantially automatically connected to the power, resolver, fluid inlet and fluid outlet connectors 86*a*, 88*a*, 90*a*, 92*a*, respectively, on the apparatus 10, and no further connections are required for full operation of the invert mechanism 14*a*.

Figure 10:
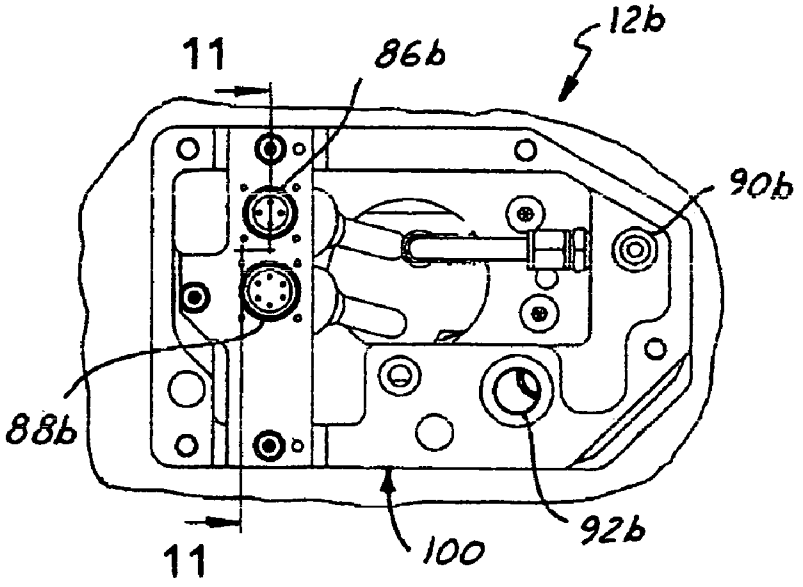
FIG. 10 is an enlarged fragmentary view of the encircled portion 10 in FIG. 3.
Figure 11:
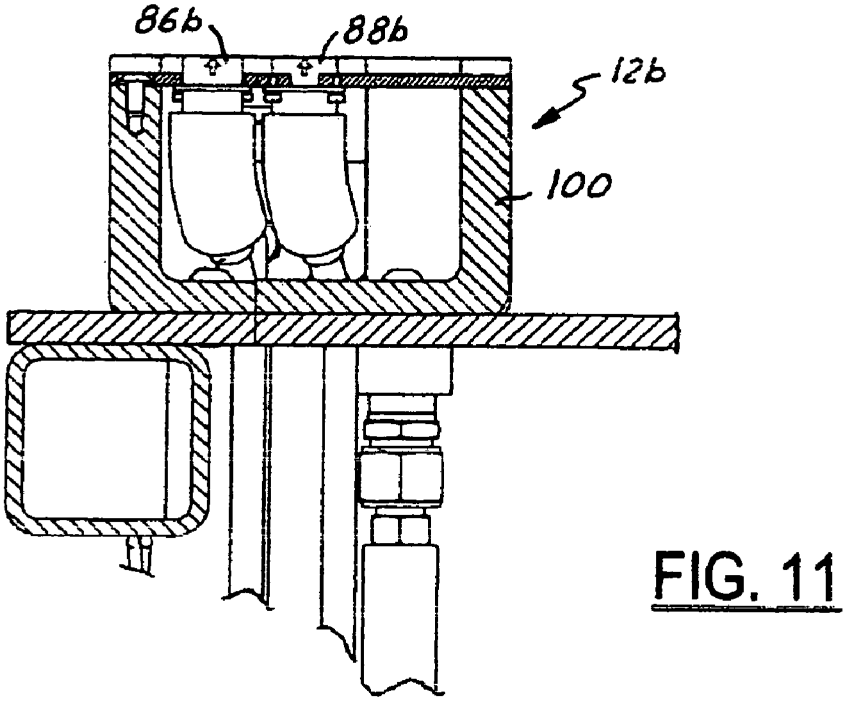
FIG. 11 is a fragmentary cross-sectional view taken generally along line 11—11 in FIG. 10.

As best shown in FIGS. 3 and 10–11, a second mounting station 12*b* of the apparatus 10 is preferably adapted to receive a takeout mechanism 14*b* for a glassware forming machine, such as that disclosed in U.S. Pat. No. 6,722,488, the disclosure of which is incorporated herein by reference in its entirety. The second mounting station 12*b* preferably includes one or more blocks 100 and is identical to the seat or mount for the takeout mechanism 14*b* that is provided on the glassware forming machine. The takeout mechanism 14*b* includes a body 102 on which an arm 103 is mounted and has tongs (not shown) to engage or grab one or more containers in a blow mold of the glassware forming machine, and to transport the containers from the blow mold to a different location, for example, a dead plate where the containers may cool at least partially before being further processed. The arm 103 is driven by a servo motor 106 to move the containers from the blow mold to the dead plate and the fingers or tongs are preferably pneumatically driven toward and away from each other. In a cycle, the tongs are closed on containers, moved to the dead plate, and opened or separated to release the containers to the dead plate.

The second mounting station 12*b* includes power, resolver, fluid inlet and fluid outlet connectors 86*b*, 88*b*, 90*b*, 92*b*, respectively, that are adapted to mate and connect with corresponding connectors (not shown) of the takeout mechanism 14*b*, preferably in the same general manner previously described with regard to the invert mechanism 14*a*. In other words, the power, resolver, fluid inlet and fluid outlet connectors 86*b*, 88*b*, 90*b*, 92*b* are preferably of the blind-mate, quick-connect type, are open facing upward in the second mounting station 12*b*, disposed generally perpendicular to the upper plate 36, and can be secured to mating connectors by straight line relative movement of the servo mechanism relative to the connectors 86*b*, 88*b*, 90*b*, 92*b*. Thus, upon securing the takeout mechanism 14*b* to the apparatus 10, the connectors 86*b*, 88*b*, 90*b*, 92*b* are simultaneously interconnected with their corresponding connectors on the takeout mechanism 14*b* and no further connections are required for full operation of the takeout mechanism 14*b*.

As best shown in FIG. 3, third mounting station 12*c* of the apparatus 10 is preferably adapted to receive an electronic sweep-out mechanism 14*c* for a glassware forming machine, such as that disclosed in U.S. Pat. No. 6,702,097, the disclosure of which is incorporated herein by reference in its entirety. The third mounting station 12*c* preferably includes one or more brackets or blocks 110 and is identical to the seat or mount for the sweep-out mechanism 14*c* that is provided on the glassware forming machine. The sweep-out mechanism 14*c* includes a rack 112 with one or more arms 114 adapted to engage and move one or more containers from a dead plate to another location, for example, an outfeed conveyor that transports the containers for further processing. The rack 112 is advanced and retracted by one servo motor 116 so that the arms are selectively disposed between and removed from between adjacent containers. The rack 112 is also driven by another servo motor 118 for angular movement between the dead plate and the outfeed conveyor. Accordingly, in one cycle of the sweepout mechanism, the rack 112 is angularly aligned with the dead plate and is extended to position the arms 114 between containers on the dead plate. Thereafter, the rack 112 is angularly displaced to move the containers to the outfeed conveyor, the rack 112 is retracted to remove the arms 114 from between the containers, and then the rack 112 is returned to its starting position for the next cycle.

The third mounting station 12*c* includes power, resolver, fluid inlet and fluid outlet connectors 86*c*, 88*c*, 90*c*, 92*c*, respectively, that are adapted to mate and connect with corresponding connectors (not shown) of the sweep-out mechanism 14*c*, preferably in the same general manner previously described with regard to the invert and takeout mechanisms 14*a*, 14*b*. In other words, the power, resolver, fluid inlet and fluid outlet connectors 86*c*, 88*c*, 90*c*, 92*c* are preferably of the blind-mate, quick-connect type, are open facing upward or generally perpendicular to the upper plate 36, and can be secured to mating connectors by straight line relative movement of the connectors. The fluid inlet and outlet connectors 90*c*, 92*c* also preferably include appropriate valves preventing fluid flow therethrough unless a sweep-out mechanism 14*c* is properly secured in the third mounting station 12*c*. Thus, upon securing the sweep-out mechanism 14*c* to the apparatus 10, the connectors 86*c*, 88*c*, 90*c*, 92*c* are simultaneously interconnected with their corresponding connectors on the sweep-out mechanism 14*c* and no further connections are necessary for full operation of the sweep-out mechanism 14*c*.

Accordingly, in one presently preferred embodiment, the apparatus 10 is adapted to receive three different servo mechanisms 14*a–c*. Each servo mechanism 14*a–c* can be operated independently of the others, and it is preferably not required to have all three mounting stations 12*a–c* occupied to operate any of the servo mechanisms 14*a–c*. Fluid flow in unoccupied mounting stations 12*a–c* is prevented by check valves, and unused power connectors and resolver can be capped or covered to reduce contamination or for other reasons. One suitable cover arrangement is shown in FIG. 3 wherein a pair of covers 120, 122 are shown in their extended position wherein one cover 120 substantially overlies the power connector 86*c* and the other cover 122 substantially overlies the resolver connector 88*c* when a servo mechanism 14*c* is not received in the third mounting station 12*c*. The covers 120, 122 are preferably movable to a retracted position wherein they are spaced from the connectors 86*c*, 88*c* to permit access to them by a servo mechanism 14*c*, and may be held in their retracted position by a latch 124. Preferably, the covers are biased, such as by a spring (not shown), to their extended position and are automatically released from the latch 124 upon removal of the servo mechanism 14*c* from the third mounting station 12*c*. In this manner, the covers 120, 122 automatically return to their extended position when a servo mechanism 14*c* is removed from the mounting station 12*c*.

Preferably, all of the mounted servo mechanisms 14*a–c* may be simultaneously operated without interference, and can preferably be operated through their full ranges of motion as if mounted on an operating glassware forming machine. Preferably, the controller 48 used to operate the servo mechanisms 48 is programmed to operate or capable of operating the mechanisms 14*a–c* in the same manner as if they were installed in a glassware forming machine. New, repaired or serviced servo mechanisms can be "run-in" or initially operated to ensure full compliance with all operation requirements, and this can be done without interruption to the glassware forming machine thereby decreasing its downtime and increasing its efficiency. Further, satisfactory operation of the servo mechanisms 14*a–c* can be ensured on the apparatus 10 so fewer or no test cycles are needed when the servo mechanisms 14*a–c* are later initially installed in a glassware forming machine, thereby further increasing the efficiency of the glassware forming machine. Also, the servo mechanisms 14*a–c* can be tested and/or monitored while on the apparatus to troubleshoot problems, or improve performance of the servo mechanisms 14*a–c*, and also the controller 48, its parameters, and its software.

While certain preferred embodiments, constructions, arrangements, and aspects of particular components of the apparatus 10 have been shown and described herein, one of ordinary skill in this art will readily understand that modifications and substitutions can be made without departing from the spirt and scope of the invention as defined by the appended claims. Further, relative adjectives like "upper," "lower," "above," "below" and the like are used to describe features of the apparatus and method with respect to the position and orientation of such features as shown in the accompanying drawings of the presently preferred embodiments, and are not intended to limit the scope of the invention.

The invention claimed is:

1. An apparatus to test at least two servo mechanisms, including:

a portable frame;

a fluid source carried by the frame;

at least two mounting stations carried by the frame, each mounting station adapted to receive a separate servo mechanism;

at least two power outputs with each of said at least two power outputs communicating with a separate one of the mounting stations; and at least two fluid connectors with each of said at least two fluid connectors communicating with the fluid source and with a separate one of the mounting stations to permit fluid communication between the fluid source and the mounting stations and adapted to communicate with each servo mechanism mounted in the mounting stations to provide fluid flow to the servo mechanisms, wherein said power outputs each include a separate power connector with each power connector being a blind mate connector adapted to be secured to at least one of said servo mechanisms when said servo mechanism is mounted at a mounting station.

2. The apparatus of claim 1 wherein the power connectors are open within the mounting station and are connectable with said at least one of said servo mechanisms by linear motion of the servo mechanism relative to the power connector.

3. The apparatus of claim 1 which also includes a cover for at least one of said power outputs, said cover being moveable between an extended position at least substantially overlying the power output when at least one of said servo mechanisms is not mounted in the corresponding mounting station and a retracted position to permit access to the power output when mounting said at least one of said servo mechanisms in the corresponding mounting station.

4. An apparatus to test at least two servo mechanisms, including:

a portable frame;

a fluid source carried by the frame;

at least two mounting stations carried by the frame, each mounting station adapted to receive a separate servo mechanism;

at least two power outputs with each of said at least two power outputs communicating with a separate one of the mounting stations;

at least two fluid connectors with each of said at least two fluid connectors communicating with the fluid source and with a separate one of the mounting stations to permit fluid communication between the fluid source and the mounting stations and adapted to communicate with each servo mechanism mounted in the mounting stations to provide fluid flow to the servo mechanisms; and at least two resolver connectors, with a separate resolver connector in communication with each of the mounting stations and adapted to communicate with at least one of said a servo mechanisms when said servo mechanism is mounted in a mounting station, wherein said resolver connectors are blind mate connectors adapted to be secured to said at least one of said servo mechanisms when said servo mechanism is mounted at a mounting station.

5. The apparatus of claim 4 wherein said resolver connectors are open within the mounting station and connectable with said at least one of said servo mechanisms by linear motion of the servo mechanism relative to the resolver connector.

6. An apparatus to test at least two servo mechanisms, including:

a portable frame;

a fluid source carried by the frame;

at least two mounting stations carried by the frame, each mounting station adapted to receive a separate servo mechanism;

at least two power outputs with each of said at least two power outputs communicating with a separate one of the mounting stations;

at least two fluid connectors with each of said at least two fluid connectors communicating with the fluid source and with a separate one of the mounting stations to permit fluid communication between the fluid source and the mounting stations and adapted to communicate with each servo mechanism mounted in the mounting stations to provide fluid flow to the servo mechanisms; and a cover for at least one of said power outputs, said cover being moveable between an extended position at least substantially overlying the power output when at least one of said servo mechanisms is not mounted in the corresponding mounting station and a retracted position to permit access to the power output when mounting said at least one of said servo mechanisms in the corresponding mounting station.

7. The apparatus of claim 6 wherein said power outputs each include a separate power connector with each power connector being a blind mate connector adapted to be secured to at least one of said servo mechanisms when said servo mechanism is mounted at a mounting station.

8. The apparatus of claim 6 which also includes at least two resolver connectors, with a separate resolver connector in communication with each of the mounting stations and adapted to communicate with at least one of said a servo mechanisms when said servo mechanism is mounted in a mounting station.

9. The apparatus of claim 8 wherein said resolver connectors are blind mate connectors adapted to be secured to said at least one of said servo mechanisms when said servo mechanism is mounted at a mounting station.

10. The apparatus of claim 6 wherein said cover is yieldably biased toward its extended position and in the absence of said at least one of said servo mechanisms being mounted in the corresponding mounting station, the cover is in its extended position under the biasing force.

11. The apparatus of claim 6 wherein two fluid connectors are provided for each mounting station with one connector at each mounting station permitting fluid flow from said fluid source to said mounting station and the other fluid connector at each mounting station permitting fluid flow from said mounting station to said fluid source permitting recirculation of the fluid from the fluid source.

12. The apparatus of claim 6 wherein three mounting stations are provided with each adapted to receive a separate servo mechanism, three power outputs are provided to interconnect each servo mechanism with a power supply, and three fluid connectors are provided to interconnect each servo mechanism with said fluid source.

13. The apparatus of claim 12 which also includes three resolver connectors carried by the frame to interconnect each servo mechanism with a controller.

14. The apparatus of claim 12 where said power outputs are independently communicated with the power supply permitting each servo mechanism to be independently actuated.

15. The apparatus of claim 14 which also includes a controller that selectively communicates the power supply with the servo mechanisms received in said mounting stations.

16. The apparatus of claim 6 wherein said fluid connectors each include a valve that is normally closed to prevent fluid flow therethrough and is opened when connected to at least one of said servo mechanisms, said fluid connectors being blind mate connectors that are automatically interconnected with connectors on the servo mechanism when the servo mechanism is mounted in at least one of said mounting stations.

17. An apparatus to test at least two servo mechanisms, including:

a portable frame;

a fluid source carried by the frame;

at least two mounting stations carried by the frame, each mounting station adapted to receive a separate servo mechanism;

at least two power outputs with each of said at least two power outputs communicating with a separate one of the mounting stations; and at least two fluid connectors with each of said at least two fluid connectors communicating with the fluid source and with a separate one of the mounting stations to permit fluid communication between the fluid source and the mounting stations and adapted to communicate with each servo mechanism mounted in the mounting stations to provide fluid flow to the servo mechanisms;

wherein two fluid connectors are provided for each mounting station with one connector at each mounting station permitting fluid flow from said fluid source to said mounting station and the otherfluid connector at each mounting station permitting fluid flow from said mounting station to said fluid source permitting recirculation of the fluid from the fluid source.

18. An apparatus to test at least two servo mechanisms, including:

a portable frame;

a fluid source carried by the frame;

at least two mounting stations carried by the frame, each mounting station adapted to receive a separate servo mechanism;

at least two power outputs with each of said at least two power outputs communicating with a separate one of the mounting stations; and at least two fluid connectors with each of said at least two fluid connectors communicating with the fluid source and with a separate one of the mounting stations to permit fluid communication between the fluid source and the mounting stations and adapted to communicate with each servo mechanism mounted in the mounting stations to provide fluid flow to the servo mechanisms;

wherein said fluid connectors each include a valve that is normally closed to prevent fluid flow therethrough and is opened when connected to at least one of said servo mechanisms, said fluid connectors being blind mate connectors that are automatically interconnected with connectors on the servo mechanism when the servo mechanism is mounted in at least one of said mounting stations.

* * * * *